United States Patent
Kelwaski et al.

(10) Patent No.: US 6,724,102 B1
(45) Date of Patent: Apr. 20, 2004

(54) PROGRAMMABLE MATRIX CONTROLLER FOR CORRELATING ELECTRIC DEVICES IN A MOTOR VEHICLE WITH SWITCHES OF A SWITCH MODULE

(75) Inventors: H. Edward Kelwaski, Craigville, IN (US); Robert D. Dannenberg, Auburn, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 09/626,757

(22) Filed: Jul. 27, 2000

(51) Int. Cl.[7] .................................................. B60L 1/00
(52) U.S. Cl. .......................... 307/10.1; 307/115; 701/36
(58) Field of Search ................................. 307/9.1, 10.1, 307/115; 200/5 R, 5 A, 237, 329, 339, 341; 701/36

(56) References Cited

U.S. PATENT DOCUMENTS

| | | | |
|---|---|---|---|
| 3,810,118 A | * 5/1974 | Kiffmeyer | 700/1 |
| 4,288,672 A | * 9/1981 | Puccini | 200/314 |
| 4,719,532 A | * 1/1988 | Schneider | 361/189 |
| 4,760,218 A | 7/1988 | Gutman | |
| 4,792,783 A | * 12/1988 | Burgess et al. | 307/10.1 |
| 4,942,571 A | * 7/1990 | Moller et al. | 307/10.1 |
| 4,959,831 A | 9/1990 | Wroblewski | |
| 5,081,586 A | * 1/1992 | Barthel et al. | 307/10.1 |
| 5,198,809 A | * 3/1993 | Day | 307/139 |
| 5,275,012 A | * 1/1994 | Dage et al. | 62/208 |
| 5,428,535 A | * 6/1995 | Katsumata et al. | 701/36 |
| 5,805,402 A | * 9/1998 | Maue et al. | 307/10.1 |
| 5,990,571 A | * 11/1999 | Sato et al. | 307/10.1 |
| 6,040,788 A | * 3/2000 | Chambers et al. | 341/20 |
| 6,067,302 A | 5/2000 | Tozuka | |
| 6,114,776 A | * 9/2000 | Ito et al. | 307/10.1 |
| 6,483,048 B1 | * 11/2002 | Bontrager et al. | 200/5 R |

* cited by examiner

Primary Examiner—Gregory J. Toatley, Jr.
Assistant Examiner—Sharon A. Polk
(74) Attorney, Agent, or Firm—Jeffrey P. Calfa; Dennis Kelly Sullivan; Susan L. Lukasik

(57) ABSTRACT

A switch module in an instrument panel of a motor vehicle contains multiple switch assemblies connected by wiring to a controller. Multiple devices controlled by the switch assemblies are connected by wiring to the controller. The controller has a programmed matrix correlating a switch input from each particular switch assembly in the module with a particular device to place each particular device under control of the corresponding switch assembly.

5 Claims, 3 Drawing Sheets

FIG. 4A

| SLOT #1 | SLOT #2 | SLOT #3 | SLOT #4 | SLOT #5 | SLOT #6 |
|---|---|---|---|---|---|
| FUNCTION A | FUNCTION B | FUNCTION C | FUNCTION D | FUNCTION E | FUNCTION F |

| SLOT #1 | SLOT #2 | SLOT #3 | SLOT #4 | SLOT #5 | SLOT #6 |
|---|---|---|---|---|---|
| A | B | C | D | E | F |

| SLOT #1 | SLOT #2 | SLOT #3 | SLOT #4 | SLOT #5 | SLOT #6 |
|---|---|---|---|---|---|
| FUNCTION B | FUNCTION C | FUNCTION D | FUNCTION E | FUNCTION F | FUNCTION A |

| SLOT #1 | SLOT #2 | SLOT #3 | SLOT #4 | SLOT #5 | SLOT #6 |
|---|---|---|---|---|---|
| B | C | D | E | F | A |

66

PROGRAMMABLE MATRIX CONTROLLER FOR CORRELATING ELECTRIC DEVICES IN A MOTOR VEHICLE WITH SWITCHES OF A SWITCH MODULE

FIELD OF THE INVENTION

This invention relates generally to motor vehicle electrical systems, and is particularly directed toward a controller having a programmable matrix for correlating control of electric devices in a motor vehicle with switches of a switch module in an instrument panel of the vehicle.

BACKGROUND AND SUMMARY OF THE INVENTION

An instrument panel of a motor vehicle contains electric switches for operating various devices in the vehicle. For any of various reasons, such as limitations on space available for the number of switches that are desired to be used in a particular instrument panel, it may be important to use switches that are relatively compact in package size. It may also be desirable to group the switches into modules, or clusters.

Instrument panel switch modules that have identical switch groupings, or clusters, but are designed for use in different vehicle models, may utilize switches that are in particular locations in the switch cluster in different ways depending on the particular vehicle model. A customer may desire that certain devices in a vehicle be controlled by switches in certain positions in a switch module.

The present invention relates to an electrical system of a motor vehicle that allows functions controlled by switches in a switch module to be correlated with the switches in a more efficient manner than by hard wiring of a device to a switch in the module. In this way many components of a switch module may be mass-produced so as to be potentially useful in any switch module. A switch module may be rendered unique to requirements of a particular vehicle model or requirements of a particular customer by particular indicia on a switch actuator and appropriate programming of a matrix in a controller that interfaces the switches in the module with the devices controlled by the switches.

In one respect the invention relates to a motor vehicle comprising a controller, a switch module containing multiple switch assemblies connected by wiring to the controller, and multiple devices connected by wiring to the controller. The controller comprises a programmed matrix correlating a switch input from each particular switch assembly in the module with a particular device to place each particular device under control of the corresponding switch assembly.

In another respect the invention relates to a method of electrically associating switch assemblies of a switch module in an instrument panel of a motor vehicle with devices in the vehicle through an electrical system of the vehicle that has a controller interfacing the switch module and the devices. The method comprises providing each switch assembly with indicia related to a respective device controlled by the switch assembly, disposing each switch assembly in a location in the module that is electrically connected to a particular input of the controller, and programming the controller with a matrix that correlates each input of the controller with a device that corresponds to the indicia for the respective switch assembly connected to the respective input.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

BRIEF DESCRIPTION OF THE DRAWING

FIGS. 4A and 4B are diagrammatic views showing correlation of switches in a switch module with devices controlled by the switches.

FIGS. 5A and 5B are diagrammatic views showing a different correlation of switches in a switch module with devices controlled by the switches.

DESCRIPTION OF THE PREFERRED EMBODIMENT

Figure 1:
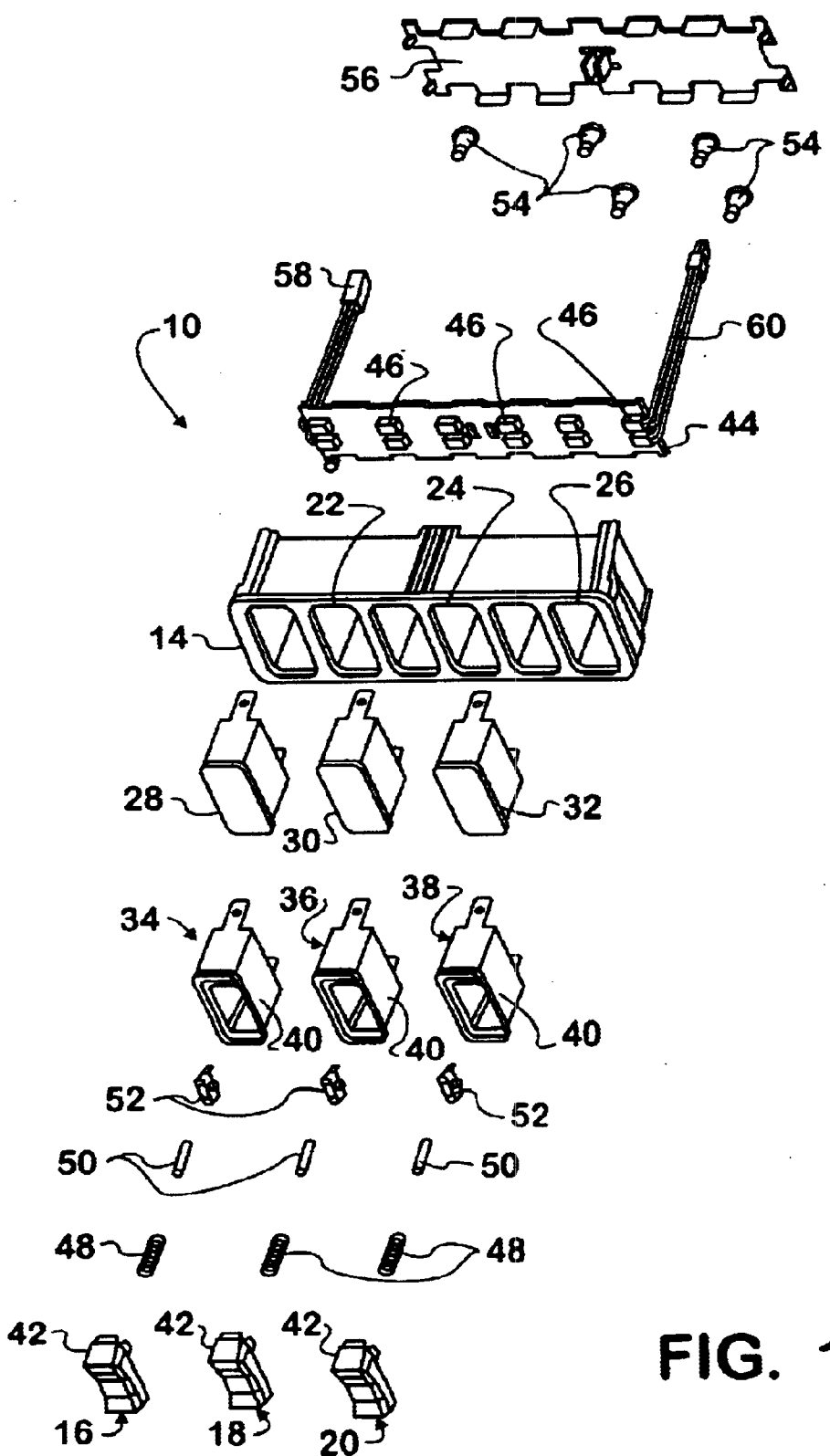
FIG. 1 is an exploded perspective view of an instrument panel switch module that embodies principles of the present invention.
Figure 2:
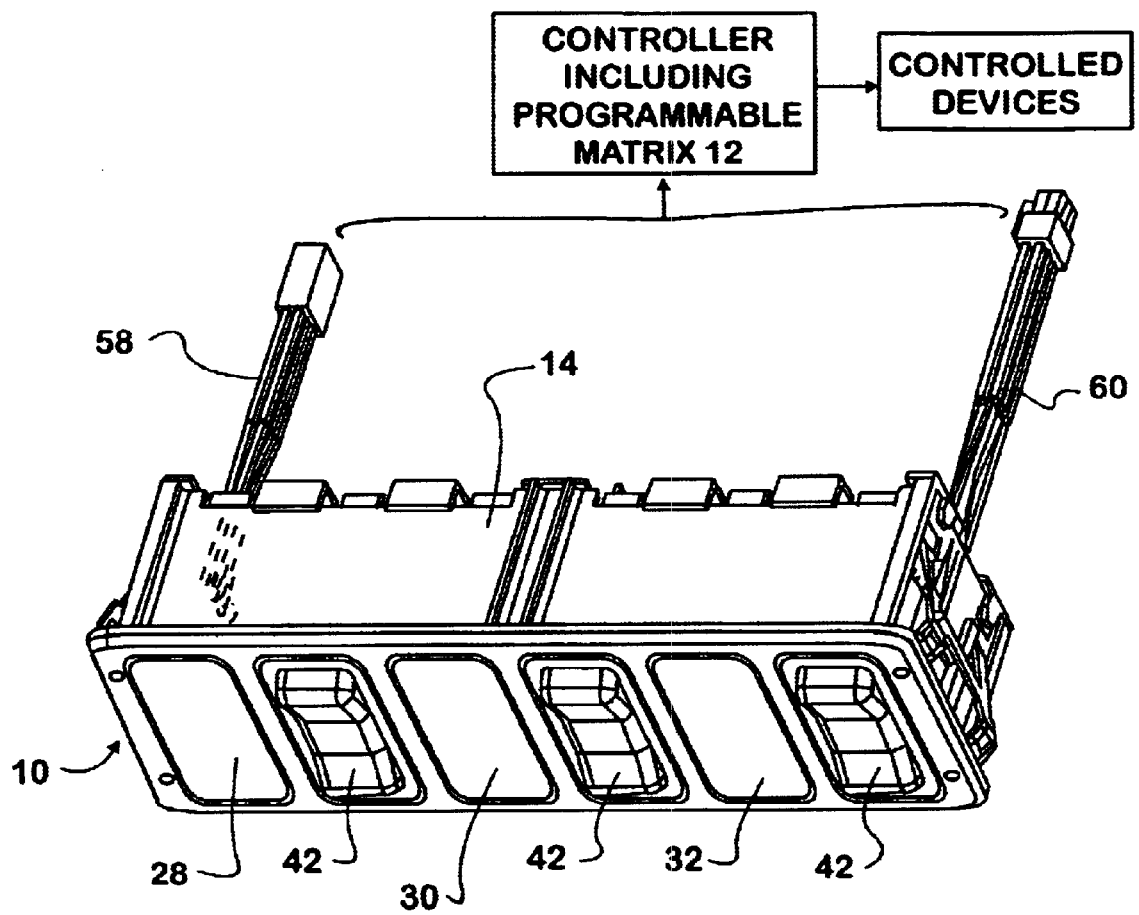
FIG. 2 is an enlarged non-exploded perspective view of the switch module.
Figure 3:
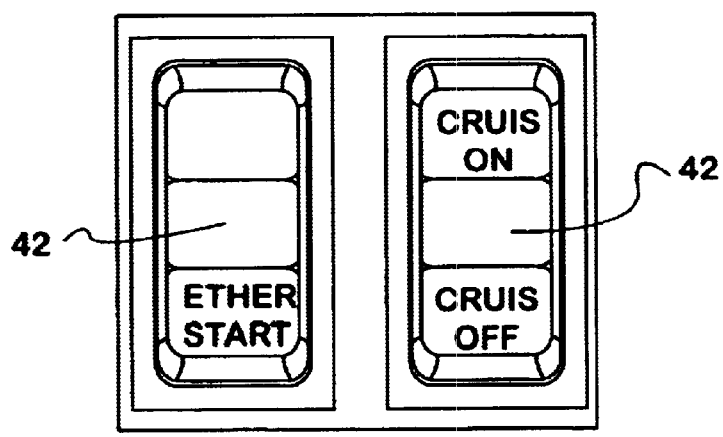
FIG. 3 is an enlarged view of the front of a portion of a switch module.

FIGS. 1, 2, and 3 show an example of an instrument panel switch module 10 that is associated with an electrical system of a motor vehicle in accordance with principles of the invention. The electrical system includes a controller 12 with which switch module 10 is connected by wiring. Controller 12 monitors the status of individual switch assemblies of module 10 and controls various devices in the vehicle in accordance with the status of the module switch assemblies, as will be more fully explained hereinafter.

Switch module 10 comprises a generally rectangular housing 14 that is capable of holding up to a maximum of six switch assemblies side-by-side within its interior. In this example, only three switch assemblies 16, 18, 20 are present, disposed in alternate rectangular apertures 22, 24, 26 arranged side-by-side in a front face of housing 14. The intervening apertures are closed by closeout blanks 28, 30, 32.

Respective actuators 34, 36, 38 of the respective switch assemblies 16, 18, 20 register with the respective apertures 22, 24, 26 so as to make the actuators accessible at the front of module 10 to a driver of the vehicle. By way of example, each switch assembly is portrayed as a rocker type device that comprises a rocker housing 40 that is received in the respective aperture 22, 24, 26. Each housing 40 provides a mounting for a respective rocker 42 that forms the switch actuator.

Also disposed within the interior of housing 14 behind the rocker housings is a printed wiring board 44 which may be considered to have six side-by-side zones, alternate ones of which register with the rear of a respective rocker housing 40. Wiring board 44 is fabricated as a substantially rigid part by using known methods and known materials. Individual electric switch devices 46 mount on wiring board 44. Each is disposed behind a respective rocker housing 40.

Each switch assembly further includes a respective internal actuating mechanism for enabling a respective rocker 42 to operate a respective switch device 46. Such internal actuating mechanisms include springs 48, push rods 50, and actuation cams 52 via which rocking motion imparted to a rocker 42 acts on a respective switch device 46 to cause the state of the switch device to change from one state to another. Illumination lamps 54 also mount on wiring board 44, and a cover 56 closes the back of housing 14. Wiring pigtails 58, 60, attached to wiring board 44, extend from housing 14 to provide for module 10 to be connected to connectors of vehicle wiring harnesses (not shown) and thereby electrically connect switch assemblies 16, 18, 20 with controller 12.

Controller 12 is processor-based and programmed to associate a particular switch assembly 16, 18, 20 with a particular device in the vehicle such that the particular switch assembly controls a function of the particular device. Such devices may be various lamps or accessories. FIG. 3 shows two examples, one an ether start for an engine and the other, cruise control. Suitable indicia, either nomenclature and/or a graphic, may be applied to a rocker 42 to identify the function controlled by the rocker. In the case of the ether start example, pushing on the lower portion of the rocker is effective to initiate ether start of the vehicle engine. In the case of the cruise control example, pushing on the upper portion of the rocker turns the cruise control function on, which pushing on the lower portion of the rocker turns the cruise control function off.

For associating the correct switch assembly with each control function, wiring connections from module 10 to controller 12 correlate each switch assembly with a particular input of the controller. When a switch assembly is actuated, the controller thereby knows which one it is. For correlating a switch actuation with the proper function, controller 12 has a matrix that is appropriately programmed to relate each switch actuation to the intended function.

A first example of a programmed matrix 64 is shown by FIGS. 4A and 4B. The example uses six switch assemblies each of which performs a respective function A, B, C, D, E, F. The switch assemblies are arranged in that order from left to right in module 10 as shown in FIG. 4A. FIG. 4B shows the programmed matrix for associating each switch assembly with the particular function that it controls.

A second example of a programmed matrix 66 is shown by FIGS. 5A and 5B. The second example also uses six switch assemblies each of which performs a respective function A, B, C, D, E, F, but now the switch assemblies are arranged in a different order from left to right in module 10. When compared with the first example, the benefit of the invention becomes apparent. All that need be done to properly correlate each function with the proper switch is to appropriately program the matrix by known programming procedures.

The controller may operate the devices via driver circuits under the control of control signals generated by the controller operating through the matrix. When a switch is actuated by pressing its rocker, the controller operates the appropriate driver.

The ability to apply any particular indicia to any particular rocker allows switch modules to be customized to customer requirements for particular switch functions in particular location in housing 14, while the internal parts of the modules and the wiring harnesses to the controller remain unchanged. Hence, significant manufacturing economies can be achieved in conjunction with the ability to customize the switch module to relevant requirements. The actuators may be of identical construction, with the only differences being in the nature of the particular indicia on the rockers. The electric switch devices 46 may also be identical.

While a presently preferred embodiment of the invention has been illustrated and described, it should be appreciated that principles of the invention are applicable to all embodiments that fall within the scope of the following claims.

What is claimed is:

1. A motor vehicle comprising:

a controller;

a switch module containing multiple switch assemblies connected by wiring to the controller, each switch assembly being located in a particular location in the switch module, and each particular location being connected to a particular input of the controller; and multiple controlled devices that perform certain vehicle functions and are connected by wiring to the controller;

wherein the controller comprises a programmable matrix that has been programmed for correlating the particular switch assembly in each particular location in the switch module with a particular controlled device to place each particular controlled device under control of the corresponding switch assembly.

2. A motor vehicle as set forth in claim 1 in which the switch module comprises a face containing switch actuators of the switch assemblies and a wiring board behind the switch actuators, wherein each switch assembly further comprises a respective electric switch device that is mounted on the wiring board behind the respective switch actuator for actuation by the respective switch actuator.

3. A motor vehicle as set forth in claim 2 in which the switch actuators are identical in construction but comprise unique indicia representing unique functions.

4. A motor vehicle as set forth in claim 3 in which the electric switch devices mounted on the wiring board are identical in construction.

5. A method of electrically associating switch assemblies of a switch module in an instrument panel of a motor vehicle with devices in the vehicle through an electrical system of the vehicle that has a controller interfacing the switch module and the devices, the method comprising:

providing each switch assembly with indicia related to a respective device controlled by the switch assembly;

disposing each switch assembly in a location in the module that is electrically connected to a particular input of the controller; and programming the controller with a matrix that correlates each input of the controller with a device that corresponds to the indicia for the respective switch assembly connected to the respective input.

\* \* \* \* \*